(12) United States Patent
Lee

(10) Patent No.: US 11,947,945 B2
(45) Date of Patent: Apr. 2, 2024

(54) APPARATUS AND METHOD OF UPDATING SOFTWARE OF A VEHICLE CLUSTER

(71) Applicants: HYUNDAI MOTOR COMPANY, Seoul (KR); KIA CORPORATION, Seoul (KR)

(72) Inventor: Young Jin Lee, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 238 days.

(21) Appl. No.: 17/354,812

(22) Filed: Jun. 22, 2021

(65) Prior Publication Data
US 2022/0050672 A1 Feb. 17, 2022

(30) Foreign Application Priority Data
Aug. 13, 2020 (KR) .................. 10-2020-0101998

(51) Int. Cl.
*G06F 8/65* (2018.01)
*G06F 13/42* (2006.01)

(52) U.S. Cl.
CPC ............ *G06F 8/65* (2013.01); *G06F 13/4282* (2013.01); *G06F 2213/0042* (2013.01)

(58) Field of Classification Search
CPC .......................................... G06F 8/65
See application file for complete search history.

(56) References Cited

U.S. PATENT DOCUMENTS

2015/0007155 A1* 1/2015 Hoffman .................. G06F 8/65
717/168

OTHER PUBLICATIONS

Chang, Yeongjun,"KR102025744B1 Apparatus for updating cluster of vehicle", Digen Co Ltd, pp. 1-5, Sep. 26, 2019. (Year: 2019).*

* cited by examiner

*Primary Examiner* — Duy Khuong T Nguyen
(74) *Attorney, Agent, or Firm* — Lempia Summerfield Katz LLC

(57) ABSTRACT

An apparatus and a method of updating cluster software use a universal serial bus (USB) terminal. The method includes connecting a USB memory to a USB socket of the USB terminal, determining whether a cluster software update file is present in the USB memory, by a head unit, when there is the cluster software update file, changing a USB host to a cluster, and receiving data for update from the USB memory and updating the software of the cluster, by the cluster.

15 Claims, 4 Drawing Sheets

APPARATUS AND METHOD OF UPDATING SOFTWARE OF A VEHICLE CLUSTER

This application claims the benefit of and priority to Korean Patent Application No. 10-2020-0101998, filed on Aug. 13, 2020, the entire content of which is hereby incorporated by reference as if fully set forth herein.

BACKGROUND

Field of the Disclosure

The present disclosure relates to software update of a vehicle cluster, and more particularly to an apparatus and a method of updating cluster software using a universal serial bus (USB) terminal.

Discussion of the Related Art

A vehicle cluster provides any information related to vehicle driving and information on an operating state of various devices such as an engine to a driver and is usually installed in front of a driver's seat. In such a cluster, a number of gauges, such as a speedometer, a section odometer, a totalizer, a tachometer indicating the RPM of an engine, a fuel gauge indicating the remaining amount of fuel, and a thermometer indicating the temperature of a coolant are mounted. In addition, a brake warning light, a seat belt warning light, an ABS warning light, a TCS warning light, and an indicator for displaying an operating state and warning state of other in-vehicle subsystems are installed to provide comprehensive detailed information about the vehicle.

The cluster includes various control devices to display information corresponding to each function. With the increase of display information, the number of such subordinate devices has gradually increased. In other words, compared with a conventional cluster, a cluster that has been currently developed and applied to a vehicle has become more complex and electronic. To this end, in a cluster device, a control program for controlling the same, a self-diagnosis program, or the like is installed.

However, the control program or the self-diagnosis program needs to be periodically updated. This is because various subordinate devices provided in the cluster are improved or upgraded. Needless to say, in this case, a program for diagnosing the subordinate devices also needs to be updated.

Conventionally, in order to update such a control program, after a cluster panel is disassembled, a storage device of a cluster device needs to be separated and updated through a separate update apparatus. In other words, it is not easy to update the storage device. Specifically, the cluster panel is disassembled, the storage device, i.e., a memory card, is updated using the update apparatus, and then the cluster panel is assembled again. This is inevitably difficult for ordinary people to do.

Accordingly, a car center updates a storage device for a fee, or a vehicle is frequently driven without updating the storage device. This means that time and expenses are unnecessary consumed, and if the storage device is not updated, it is impossible to use improved functions of a cluster device.

SUMMARY

Accordingly, the present disclosure is directed to an apparatus and a method of updating software of a vehicle cluster for easily updating various programs related to the vehicle cluster remotely.

The technical problems solved by the embodiments are not limited to the above technical problems and other technical problems which are not described herein should become apparent to those having ordinary skill in the art from the following description.

To achieve these objects and other advantages and in accordance with the purpose of the present disclosure, as embodied and broadly described herein, a software update apparatus of a vehicle cluster includes a universal serial bus (USB) terminal including a USB socket and a HUB integrated circuit (IC) for switching a data transmission path. The apparatus also includes a cluster configured to manage subordinate devices such as a speedometer, a section odometer, a fuel gauge, and a thermometer and to display information. The apparatus also includes a head unit configured to provide a navigation function and various forms of entertainment, to perform CAN communication with the cluster, to the HUB IC of the USB terminal, to transmit cluster software update data stored in the USB memory to the cluster, and to update the cluster.

In another aspect of the present disclosure, a method of updating software of a vehicle cluster includes connecting a universal serial bus (USB) device to a USB socket of a USB terminal. The method also includes determining whether a cluster software update file is present in a memory of the USB device, by a head unit. The method also includes when the cluster software update file is present, changing a USB host to a cluster. The method also includes receiving the cluster software update file from the memory and updating software of the cluster, by the cluster.

In another aspect of the present disclosure, a method of updating software of a vehicle cluster includes receiving a cluster software update file from a server via a wired or wireless connection, by a head unit. The method also includes changing a universal serial bus (USB) host of a USB terminal to a cluster, by the head unit. The method also includes receiving a cluster software update file through the USB terminal and updating software of the cluster, by the cluster.

BRIEF DESCRIPTION OF THE DRAWINGS

The accompanying drawings, which are included to provide a further understanding of the present disclosure and are incorporated in and constitute a part of this application, illustrate embodiment(s) of the present disclosure and together with the description serve to explain the principle of the present disclosure. In the drawings.

DETAILED DESCRIPTION

Figure 1:
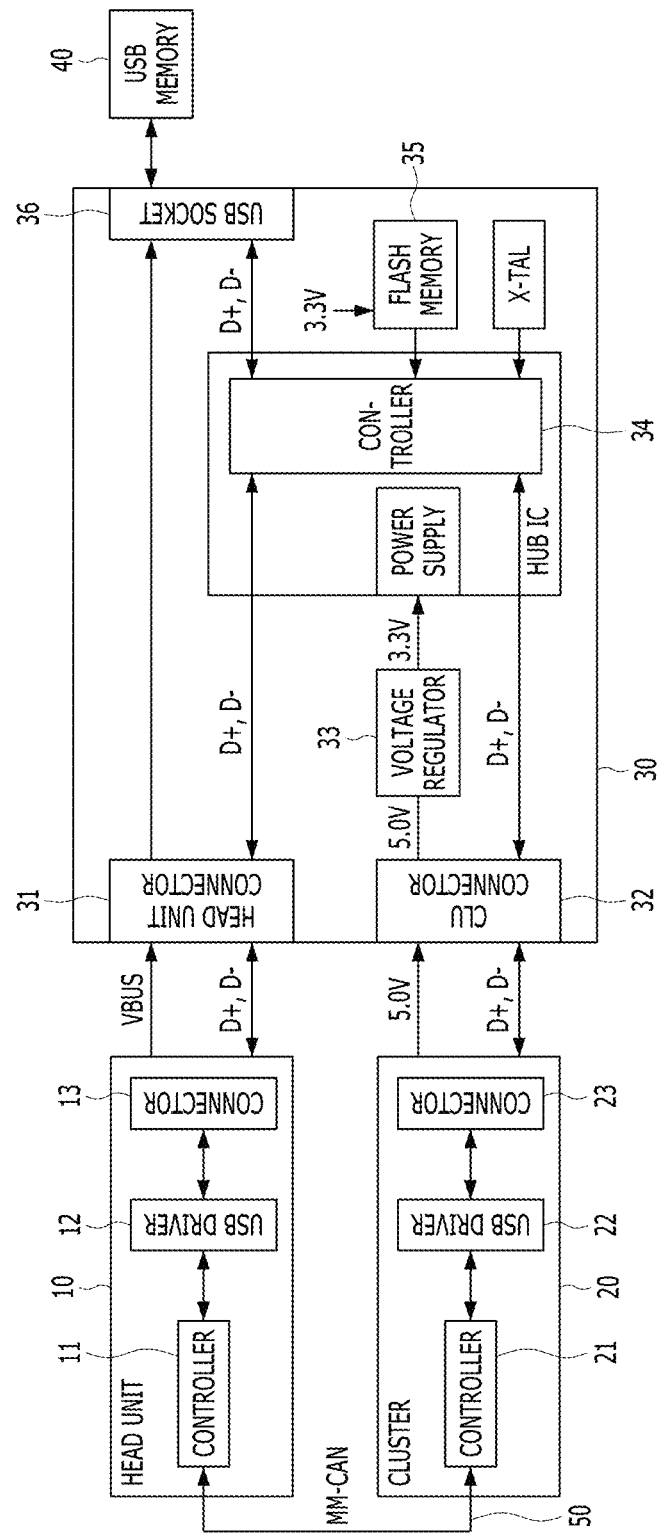
FIG. 1 is a block diagram showing the configuration of a software update apparatus of a cluster according to an embodiment of the present disclosure.

Specific embodiments of the present disclosure are described in detail with reference to the accompanying drawings so that those having ordinary skill in the art may easily implement the same. However, the present disclosure may be implemented in various different forms and is not limited to these embodiments. To clearly describe the present disclosure, parts not concerning the description have been omitted from the drawings and like reference numerals denote like elements throughout the specification.

In addition, when a certain part "includes" a certain component, this indicates that the part may further include other components, rather than necessarily excluding such other components, unless there is no disclosure to the contrary.

The component, such as "unit", "portion", "module", and "block" in the description or claims of the present disclosure should be understood as a unit that processes at least one function or operation and that may be embodied in a software manner, a hardware manner, or a combination of the hardware manner and the software manner. When a unit, portion, module, block, controller, or the like of the present disclosure is described as having a purpose or performing an operation, function, or the like, the unit, portion, module, block, or controller should be considered herein as being "configured to" meet that purpose or to perform that operation or function.

A vehicle communication protocol for communication executed in an in-vehicle network is assumed to be a controller area network (CAN), which is merely an example and is not limited thereto. It should be apparent to those ordinary skill in the art that a protocol such as a local interconnect network (LIN), the Ethernet, or flexible data-rate (CAN-FD) is applied.

Hereinafter, an apparatus and a method of updating software of a vehicle cluster are described with regard to specific embodiments of the present disclosure with reference to the attached drawings.

FIG. 1 is a block diagram showing the configuration of a software update apparatus of a cluster according to an embodiment of the present disclosure.

As shown in FIG. 1, a software update apparatus of a vehicle cluster according to the present disclosure may include a head unit 10, a cluster 20, a universal serial bus (USB) terminal 30, and a USB memory 40.

A multimedia-controller area network (MM-CAN) communication line may be connected between the head unit 10 and the cluster 20.

The head unit 10 may include a first connector 13 for connection with the USB terminal 30, a first USB driver 12 for controlling USB connection through the first connector 13, and a first controller 11 for controlling communication with the cluster 20 and controlling the first USB driver 12.

The head unit 10 may provide a CAN transceiver for CAN communication with the cluster 20. The CAN transceiver may be installed in the first controller 11 and may be installed in the head unit 10 in the form of a separate chip.

The head unit 10 may be a device for providing various forms of entertainment such as movies, television (TV) shows0, and music, as well as a navigation function. The first controller 11 of the head unit 10 may control a procedure related to update of a program through a storage medium (a USB memory).

The head unit 10 may provide a set-up menu (not shown) for updating a program. The set-up menu may be a portion of menu information provided to update cluster software. A user may update the cluster software through manipulation of a menu of the cluster software. The set-up menu may also be provided with menu information for update using a storage medium.

The cluster 20 may include a second connector 23 for connection with the USB terminal 30, a second USB driver for controlling USB connection through the second connector 23, and a second controller 21 for controlling communication with the head unit 10 and controlling the second USB driver 22.

The cluster 20 may also be provided with a CAN transceiver (not shown) for CAN communication with the head unit 10. The CAN transceiver may be installed in the second controller 21 and may be installed in the cluster 20 in the form of a separate chip.

The cluster 20 includes subordinate devices for performing different functions, such as those of a speedometer, a section odometer, a totalizer, a tachometer, a fuel gauge, a thermometer, and a plurality of warning lights.

The second controller 21 of the cluster 20 may recognize a plurality of pieces of version information of the respective subordinate devices and may have information on whether update is required. This is because the second controller 21 of the cluster 20 is capable of receiving version information of various subordinate devices, provided to the cluster 20, through CAN communication with an ECU of a vehicle.

The cluster 20 may include a display device (not shown). The display device may include, for example, a liquid crystal display (LCD) display device or an organic light-emitting diode (OLED) display device, and may display information required for an update procedure according to the present disclosure as well as state information or driving information of the vehicle in the form of a photorealistic image, a warning message, or the like.

The USB terminal 30 may include a third connector for connection with the first connector 13 of the head unit 10 through a bus line. The USB terminal 30 may also include a fourth connector 32 for connection with the second connector 23 of the cluster 20 through a bus line. The USB terminal 30 may also include a voltage regulator 33 for generating a driving voltage. The USB terminal 30 may also include a HUB integrated circuit (IC) 34 for switching a data transmission path according to control of the head unit 10. The USB terminal 30 may also include an internal memory 35 for storing an internal control program. The USB terminal 30 may also include a USB socket 36 for connecting the USB memory 40.

The USB memory 40 may store a file including data and information for updating software of the cluster 20.

The method of updating software of a vehicle cluster according to the present disclosure as configured above is described below.

Figure 2:
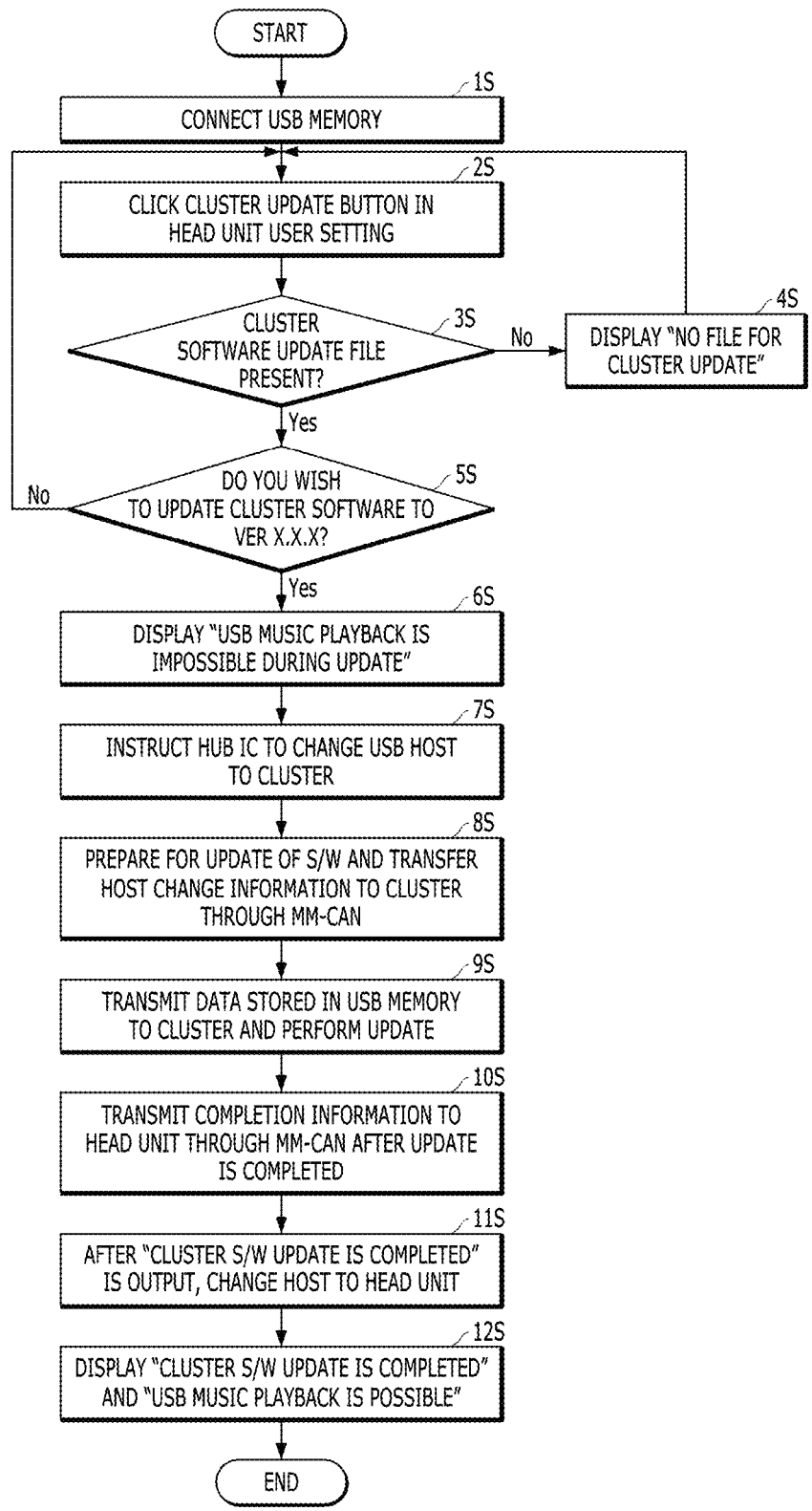
FIG. 2 is an operation flowchart showing for explaining a method of updating software of a vehicle cluster using a software update apparatus according to the present disclosure.

FIG. 2 is an operation flowchart showing for explaining a method of updating software of a vehicle cluster using a software update apparatus according to the present disclosure.

As shown in FIG. 2, the USB memory 40 may be connected to the USB socket 36 of the USB terminal 30 (1S).

As described above, when the USB memory 40 is connected to the USB terminal 30, the head unit 10 may read the file stored in the USB memory 40, may display a user setting guide on the display device of the cluster 20, and may prompt a user to select a cluster software update button (2S).

The head unit 10 may determine whether a cluster software update file (update version or "ver") is present in the USB memory 40 (3S).

As a determination result, when the cluster software update file is not present in the USB memory 40, the head unit 10 may display "No file for cluster update" on the display device of the cluster 20 (4S) and may return to operation 1S.

When the cluster software update file is present in the USB memory 40, the head unit 10 may display "Do you wish to update the cluster software to ver X.X.X?" on the display device of the cluster 20 to prompt a user to select YES or NO (5S).

When the user selects "NO" in operation 5S, the method may return to operation 1S. When the user selects "YES", the head unit 10 may display "USB music playback is impossible during update" on the display of the cluster 20 (6S).

The head unit 10 may output a signal to the HUB IC 34 of the USB terminal 30 (e.g., "D+/D−" based differential data communication) and may instruct the HUB IC 34 to change the USB host to a cluster (7S).

The head unit 10 may transfer information, indicating that the USB host is changed to the cluster, to the cluster 20 through MM-CAN (8S).

The cluster 20 may receive data for update from the USB memory 40 and may update the software of the cluster (9S).

When the software of the cluster is completely updated, the cluster 20 may transmit software update completion information to the head unit 10 through MM-CAN (10S).

When receiving the completion information from the cluster 20, the head unit 10 may output "Cluster software update is completed" to the cluster 20, may output a signal to the HUB IC 34 of the USB terminal 30, and may instruct the HUB IC 34 to change the USB host to the head unit (11S).

The cluster 20 may display "Cluster software update is completed" on the display device of the cluster 20 and may display "USB music playback is possible" (12S). In addition, the cluster software update is completed.

The head unit 10 and the cluster 20 may transmit and receive data through the USB terminal 30.

Figure 3:
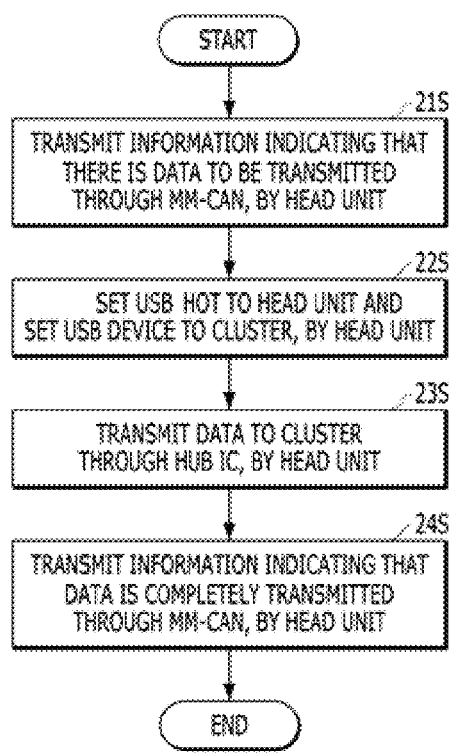
FIG. 3 is a flowchart of an operation of transmitting data to a cluster by a head unit in a software update apparatus of a vehicle cluster according to the present disclosure.

FIG. 3 is a flowchart of an operation of transmitting data to a cluster by a head unit in a software update apparatus of a vehicle cluster according to the present disclosure.

In other words, as shown in FIG. 2, when a cluster software update file is present in the USB memory 40 or a server receives the cluster software update file, the cluster software update file (data) needs to be transmitted to the cluster 20.

As such, when there is data to be transmitted to the cluster 20 from the head unit 10, the head unit 10 may transmit information, indicating that there is data to be transmitted to the cluster 20, through the MM-CAN (21S).

The head unit 10 may output a signal to the HUB IC 34 of the USB terminal 30, may change the USB host to the head unit, and may instruct the HUB IC 34 to change a USB device to a cluster (22S).

As such, when the USB host and the USB device are completely changed, the head unit 10 may transmit data to the cluster 20 through the HUB IC 34 (23S). Here, the data transmitted to the cluster 20 from the head unit 10 through the HUB IC 34 may be, for example, a cluster software update file stored in the USB memory 40 or a cluster software update file received from the server.

When data is completely transmitted to the cluster 20, the head unit 10 may indicate that the data is completely transmitted to the cluster 20 through the MM-CAN (24S).

Figure 4:
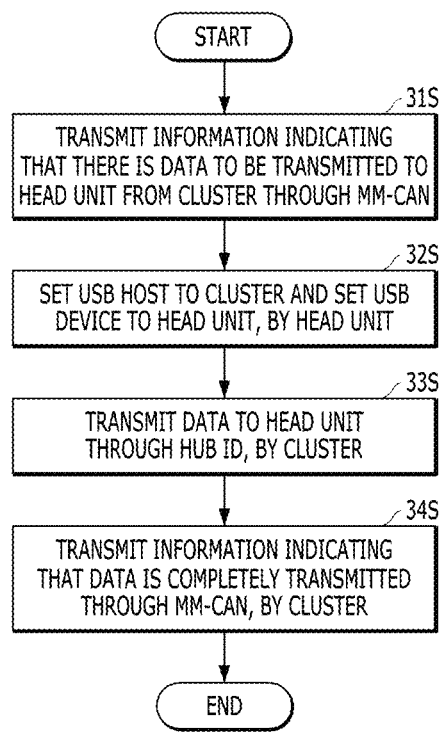
FIG. 4 is a flowchart of an operation of transmitting data to a head unit from a cluster in a software update apparatus of a vehicle cluster according to the present disclosure.

FIG. 4 is a flowchart of an operation of transmitting data to a head unit from a cluster in a software update apparatus of a vehicle cluster according to the present disclosure.

Information indicating that there is data to be transmitted to the head unit 10 by the cluster 20 may be transmitted to the head unit 10 through the MM-CAN (31S).

In operation 31S, when the head unit 10 receives the information from the cluster 20 through the MM-CAN, the head unit 10 may output a signal to the HUB IC 34 of the USB terminal 30, may change the USB host to a cluster. The head unit 10 may also instruct the HUB IC 34 to change the USB device to the head unit (32S).

As such, when the USB host and the USB device are completely changed, the cluster 20 may transmit data to the head unit 10 through the HUB IC 34 (33S). Here, the data transmitted to the head unit 10 from the cluster 20 through the HUB IC 34 may be, for example, image data captured by a forward/rear camera or the like.

When data is completely transmitted to the head unit 10, the cluster 20 may indicate that the data is completely transmitted to the head unit 10 through the MM-CAN (34S).

In the disclosed example, the case in which the head unit 10 outputs a signal to the HUB IC 34 of the USB terminal 30 and the USB host and the USB device are changed (controlled) has been described with reference to FIGS. 3 and 4. However, the present disclosure is not limited thereto and the cluster 20 may change (control) the USB host and the USB device.

In other words, in FIG. 3, when there is data to be transmitted to the cluster 20 from the head unit 10, if the head unit 10 transmits information indicating that there is data to be transmitted to the cluster 20 through the MM-CAN (21S), the cluster 20 may output a signal to the HUB IC 34 of the USB terminal 30, may change the USB host to the head unit, and may change the USB device to the cluster.

In FIG. 4, when the cluster 20 transmits information, indicating that there is data to be transmitted to the head unit 10, to the head unit 10 through the MM-CAN (31S), the cluster 20 may output a signal to the HUB IC 34 of the USB terminal 30, may change the USB host to the cluster, and may change the USB device to the head unit.

Although a method of connecting the USB memory 40 that stores the cluster software update file to the USB socket 36 of the USB terminal 30 and updating the cluster has been described with reference to FIG. 2, the present disclosure is not limited thereto. When receiving the cluster software update file via a wired or wireless connection from a server or the like, the head unit 10 may transmit the cluster software update file (data) to the cluster 20 through the USB terminal 30 and may update the software of the cluster 20.

In other words, the head unit may receive the cluster software update file via a wired or wireless connection from the server and may change the USB host of the USB terminal to the cluster. The cluster may receive the cluster software update file through the USB terminal and may update the software of the cluster.

An apparatus and a method of updating software of a vehicle cluster according to the present disclosure may have the following effects.

In the apparatus and the method of updating software of a vehicle cluster according to the present disclosure, software of various subordinate devices included in a cluster is updated using a head unit and a USB terminal. Thus, a procedure of disassembling a cluster panel to update the software of the cluster may be omitted. Therefore, the time and expense for performing update may be reduced.

Above all, an update procedure may be easily performed and thus a cluster device may always be updated to the most recent version and used.

It should be appreciated by those having ordinary skill in the art that the effects that could be achieved with the present disclosure are not limited to what has been particularly described hereinabove. Other advantages of the present disclosure should be more clearly understood from the detailed description.

It should be apparent to those having ordinary skill in the art that various modifications and variations can be made in the present disclosure without departing from the spirit or scope of the present disclosure. Thus, it is intended that the present disclosure covers the modifications and variations of the present disclosure when they come within the scope of the appended claims and their equivalents.

What is claimed is:

1. A software update apparatus of a vehicle cluster, the apparatus comprising:
   a universal serial bus (USB) terminal including a USB socket and a HUB integrated circuit (IC) for switching a data transmission path;
   a cluster; and
   a head unit configured to perform vehicle communication between the cluster and a preset protocol, to control the HUB IC of the USB terminal, to transmit cluster software update data stored in a memory connected through the USB socket to the cluster, and to update the cluster,
   wherein the head unit and the cluster transmit and receive data through the USB terminal, and
   wherein the head unit is configured to instruct the HUB IC to
     change a data transmission path through a USB device to a data transmission path through the cluster when the head unit transmits the data to the cluster, or
     change a data transmission path through the USB device to a data transmission path through the head unit when the cluster transmits the data to the head unit.

2. The apparatus of claim 1, wherein the head unit includes:
   a first connector for connection with the USB terminal;
   a first USB driver configured to control USB connection through the first connector; and
   a first controller configured to control communication with the cluster and the first USB driver.

3. The apparatus of claim 2, wherein:
   the head unit further includes a first transceiver for the vehicle communication with the cluster; and
   the first transceiver is installed in the first controller or is installed in the head unit in a form of a separate chip.

4. The apparatus of claim 2, wherein the head unit provides a set-up menu for updating a program and allows a user to update cluster software through manipulation of the set-up menu.

5. The apparatus of claim 1, wherein the cluster includes:
   a second connector for connection with the USB terminal;
   a second USB driver configured to control USB connection through the second connector; and
   a second controller configured to control communication with the head unit and the second USB driver.

6. The apparatus of claim 5, wherein:
   the cluster further includes a second transceiver for the vehicle communication with the head unit; and
   the second transceiver is installed in the second controller or is installed in the cluster in a form of a separate chip.

7. The apparatus of claim 6, wherein the USB terminal further includes:
   a third connector connected to a first connector of the head unit through a first bus line;
   a fourth connector connected to the second connector of the cluster through a second bus line;
   a voltage regulator configured to generate a driving voltage; and
   an internal memory configured to store an internal control program.

8. The apparatus of claim 5, wherein the second controller of the cluster recognizes pieces of version information of respective subordinate devices related to information displayed by the cluster and manages information on whether update is required.

9. A method of updating software of a vehicle cluster, the method comprising:
   connecting a universal serial bus (USB) device to a USB socket of a USB terminal;
   determining whether a cluster software update file is present in a memory of the USB device, by a head unit;
   when the cluster software update file is present, changing a USB host to a cluster; and
   receiving the cluster software update file from the memory and updating software of the cluster, by the cluster,
   wherein the head unit and the cluster transmit and receive data through the USB terminal, and
   wherein the method further comprises
     instructing, by the head unit, a HUB integrated circuit (IC) of the USB terminal to change a data transmission path through the USB device to a data transmission path through the cluster when the head unit transmits the data to the cluster, or
     instructing, by the head unit, the HUB IC of the USB terminal to change the data transmission path through the USB device to a data transmission path through the head unit when the cluster transmits the data to the head unit.

10. The method of claim 9, further comprising:
    when the cluster software update file is present in the memory, guiding update of the software, by the head unit; and
    when there is update selection from a user, outputting a function limited by update of the software.

11. The method of claim 9, wherein the changing the USB host to the cluster includes instructing a HUB integrated circuit (IC) of the USB terminal to change the USB host to the cluster, by the head unit.

12. The method of claim 11, further comprising:
    when the USB host is changed to the cluster, transferring information, indicating that the USB host is changed to the cluster, to the cluster through vehicle communication of a preset protocol, by the head unit.

13. The method of claim 9, wherein the changing the USB host to the cluster includes instructing a HUB IC of the USB terminal to change the USB host to the cluster, by the cluster.

14. The method of claim 9, wherein:
    when the software of the cluster is completely updated, the cluster transmits software update completion information to the head unit through vehicle communication of a preset protocol; and
    the head unit displays information indicating that the software of the cluster is completely updated.

15. A method of updating software of a vehicle cluster, the method comprising:
    receiving a cluster software update file from a server via a wired or wireless connection, by a head unit;

changing a universal serial bus (USB) host of a USB terminal to a cluster, by the head unit; and receiving a cluster software update file through the USB terminal and updating software of the cluster, by the cluster, wherein the head unit and the cluster transmit and receive data through the USB terminal, and wherein the method further comprises instructing, by the head unit, a HUB integrated circuit (IC) of the USB terminal to change a data transmission path through a USB device to a data transmission path through the cluster when the head unit transmits the data to the cluster, or instructing, by the head unit, the HUB IC of the USB terminal to change the data transmission path through the USB device to a data transmission path through the head unit when the cluster transmits the data to the head unit.

\* \* \* \* \*